United States Patent
Ail et al.

(10) Patent No.: US 11,079,833 B2
(45) Date of Patent: Aug. 3, 2021

(54) POWER MANAGEMENT APPARATUS FOR MANAGING SYSTEM POWER INCLUDING PLURALITY OF ELECTRONIC DEVICES, AND OPERATING

(71) Applicant: Samsung Electronics Co., Ltd., Suwon-si (KR)

(72) Inventors: Rohit Ail, Middlesex (GB); Yick Kit Lam, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 15/744,545

(22) PCT Filed: Jul. 13, 2016

(86) PCT No.: PCT/KR2016/007619
§ 371 (c)(1),
(2) Date: Jan. 12, 2018

(87) PCT Pub. No.: WO2017/010806
PCT Pub. Date: Jan. 19, 2017

(65) Prior Publication Data
US 2018/0196490 A1    Jul. 12, 2018

(30) Foreign Application Priority Data

Jul. 14, 2015 (GB) ...................... 1512244
Jul. 12, 2016 (KR) ...................... 10-2016-0088045

(51) Int. Cl.
G06F 1/329    (2019.01)
H02J 3/14    (2006.01)
(Continued)

(52) U.S. Cl.
CPC ............ *G06F 1/329* (2013.01); *G06F 1/3209* (2013.01); *G06F 1/3287* (2013.01); *G06Q 10/04* (2013.01);
(Continued)

(58) Field of Classification Search
None
See application file for complete search history.

(56) References Cited

U.S. PATENT DOCUMENTS

2012/0078427 A1   3/2012   Jang et al.
2012/0150359 A1   6/2012   Westergaard
(Continued)

FOREIGN PATENT DOCUMENTS

EP   2437368 A2   4/2012
EP   2802059 A1   11/2014
(Continued)

OTHER PUBLICATIONS

Communication pursuant to Article 94(3) EPC dated May 15, 2019 in connection with European Patent Application No. 16 824 723.7, 7 pages.
(Continued)

*Primary Examiner* — Mohammad Ali
*Assistant Examiner* — Saad M Kabir

(57) ABSTRACT

A method for operating a power management device. The power management device controls a state of a plurality of electronic devices included in a system. The method includes obtaining an activation request to activate at least one electronic device from among the plurality of electronic devices. The method also includes predicting power consumption of the at least one electronic device. The method further includes determining schedule information to activate the at least one electronic device based on the predicted power consumption and current power consumption of the system.

17 Claims, 10 Drawing Sheets

(51) Int. Cl.
   *H02H 11/00*    (2006.01)
   *G06Q 50/06*    (2012.01)
   *G06Q 10/04*    (2012.01)
   *G06Q 20/14*    (2012.01)
   *G06F 1/3209*   (2019.01)
   *G06F 1/3287*   (2019.01)

(52) U.S. Cl.
   CPC ............. *G06Q 20/14* (2013.01); *G06Q 50/06* (2013.01); *H02H 11/005* (2013.01); *H02J 3/14* (2013.01); *H02J 2310/14* (2020.01); *Y02B 70/30* (2013.01); *Y02B 70/3225* (2013.01); *Y04S 20/222* (2013.01); *Y04S 20/242* (2013.01)

(56) References Cited

U.S. PATENT DOCUMENTS

| | | |
|---|---|---|
| 2013/0245849 A1 | 9/2013 | Paul et al. |
| 2014/0371942 A1 | 12/2014 | Matsuyama et al. |

FOREIGN PATENT DOCUMENTS

| | | |
|---|---|---|
| EP | 2833506 A1 | 2/2015 |
| JP | H11-98688 A | 4/1999 |
| KR | 10-2011-0056332 A | 5/2011 |
| KR | 10-2012-0018854 A | 3/2012 |
| KR | 10-2012-0032683 A | 4/2012 |
| KR | 101263341 B1 | 5/2013 |
| KR | 10-2014-0109900 A | 9/2014 |
| WO | 2008077654 A1 | 7/2008 |
| WO | 2010033191 A1 | 3/2010 |

OTHER PUBLICATIONS

ISA/KR, International Search Report and Written Opinion of the International Search Authority, International Application No. PCT/KR2016/007619, dated Sep. 12, 2016, 10 pages.

Foreign Communication from Related Counterpart Application; British Patent Application No. GB1512244.3; Combined Search and Examination Report dated Jan. 26, 2016; 7 pages.

Communication from a foreign patent office in a counterpart foreign application, European Patent Office, "Supplementary European Search Report," European Application No. EP16824723.7, dated Mar. 21, 2018, 7 pages.

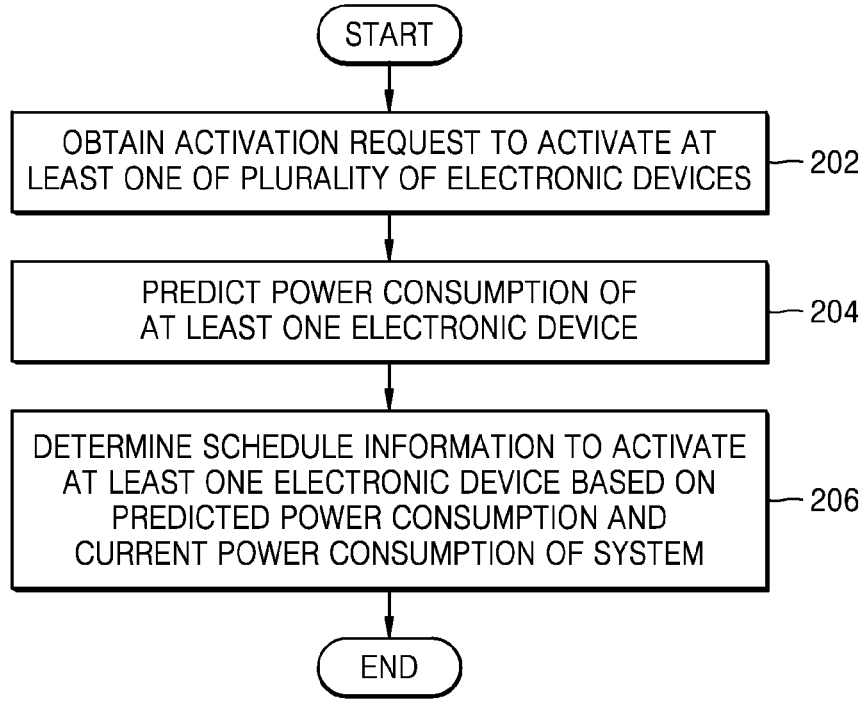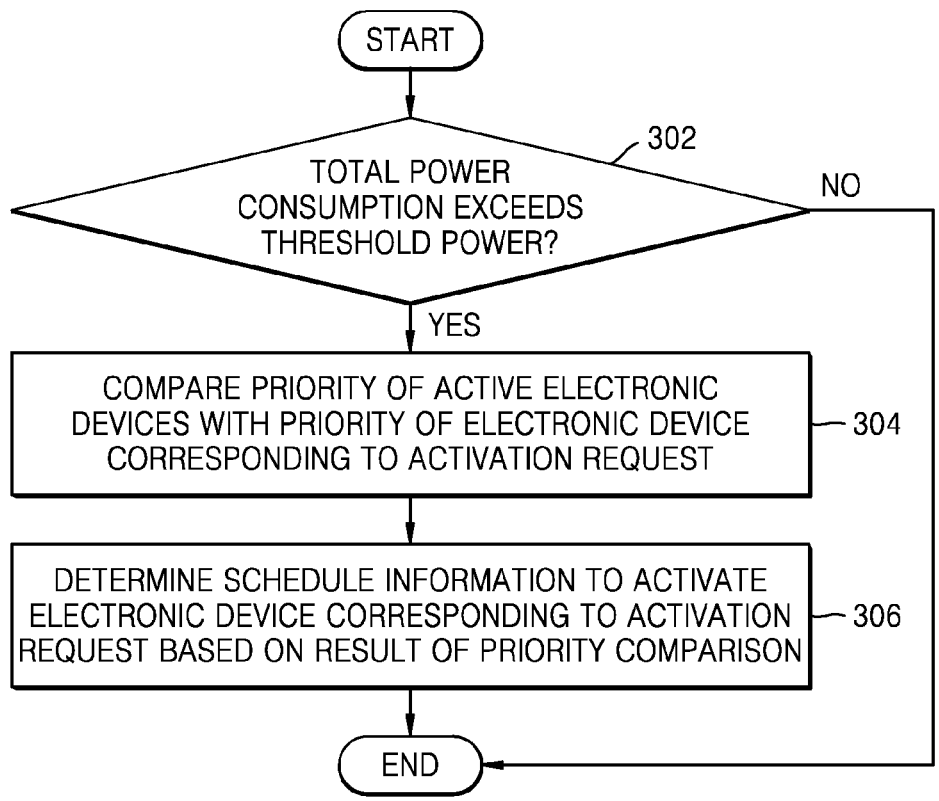

POWER MANAGEMENT APPARATUS FOR MANAGING SYSTEM POWER INCLUDING PLURALITY OF ELECTRONIC DEVICES, AND OPERATING

CROSS-REFERENCE TO RELATED APPLICATIONS AND CLAIM OF PRIORITY

The present application claims priority under 35 U.S.C. § 365 and is a 371 National Stage of International Application No. PCT/KR2016/007619, filed Jul. 13, 2016, which claims the benefit of British Patent Application No. GB 1512244.3, filed Jul. 14, 2015 and Korean Patent Application No. 10-2016-0088045, filed Jul. 12, 2016, the disclosures of which are fully incorporated herein by reference into the present disclosure as if fully set forth herein.

TECHNICAL FIELD

One or more embodiments relates to a power management device, and more particularly, to a method and device for power management of a system including a plurality of electronic devices.

BACKGROUND

In a system such as a building or a home, various electronic devices are connected to a single circuit and powered by a power supply. A user may connect a plurality of electronic devices to one power supply using an extended wire including a multi socket. In particular, when a plurality of high power-consuming electronic devices simultaneously use power, the total power consumption may exceed a maximum power capacity of the system. If a protection device is not installed, the exceeding of the maximum power capacity of the system may cause damage to the electronic devices and a power supply system of the system. Even when a protection device such as a circuit breaker is installed, tripping of the circuit breaker interrupts power supplied to the electronic devices connected to the protection device. Thus, the exceeding of the maximum power capacity is a problem and causes inconvenience. A user is inconvenienced to reset a circuit breaker in order to supply power again to the electronic devices included in the system. The above problems are expected to be exacerbated by so-called intelligent electronic devices, in which an active or inactive state is switched remotely and independently by multiple users in one system.

SUMMARY

Provided is a power management device for obtaining an activation request to activate at least one electronic device from among a plurality of electronic devices included in a system, predicting power consumption of the at least one electronic device corresponding to the activation request, and determining schedule information to activate the at least one electronic device corresponding to the activation request based on the predicted power consumption and current power consumption of the system, and a method of operating the same.

According to an aspect of an example embodiment, a method of operating a power management device for controlling a state of a plurality of electronic devices included in a system includes: obtaining an activation request to activate at least one electronic device from among the plurality of electronic devices included in the system; predicting power consumption of the at least one electronic device corresponding to the activation request; and determining schedule information to activate the at least one electronic device corresponding to the activation request based on the predicted power consumption and current power consumption of the system.

BRIEF DESCRIPTION OF THE DRAWINGS

FIG. 2 is a flowchart of an operation method of a power management device, according to an example embodiment.

FIG. 3 is a flowchart of a method, performed by a power management device, of determining schedule information, based on a priority, according to an example embodiment.

DETAILED DESCRIPTION

Figure 1:
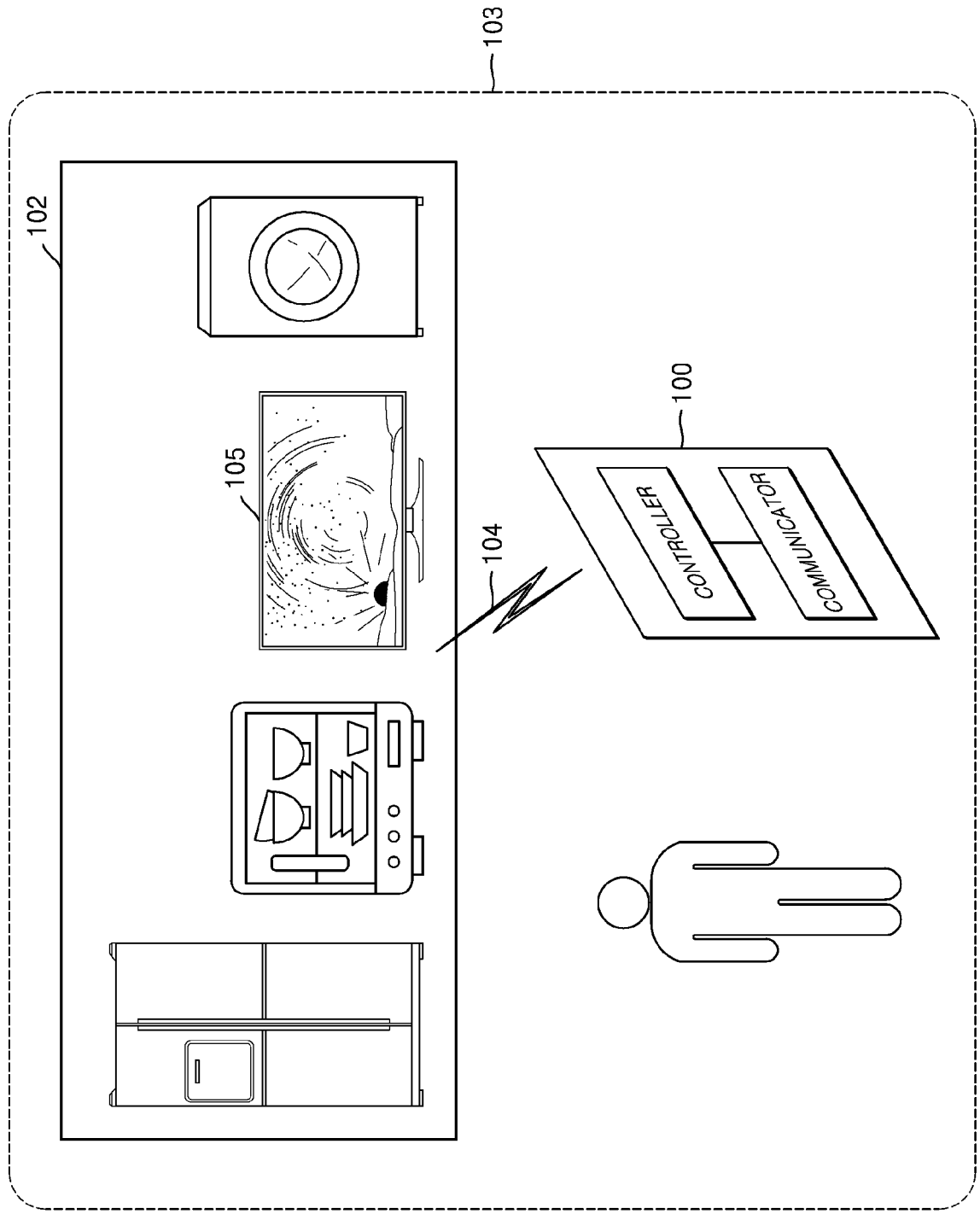
FIG. 1 is a view of a system including a power management device and electronic devices, according to an example embodiment.

A method of operating a power management device for controlling a state of a plurality of electronic devices included in a system may include: obtaining an activation request to activate at least one electronic device from among the plurality of electronic devices included in the system; predicting power consumption of the at least one electronic device corresponding to the activation request; and determining schedule information to activate the at least one electronic device corresponding to the activation request based on the predicted power consumption and current power consumption of the system.

According to an example embodiment, if a sum of the predicted power consumption and the current power consumption of the system is greater than a predetermined threshold power, then the determining of the schedule information may inactivate at least one of active electronic devices included in the system and activate the at least one electronic device corresponding to the activation request based on at least one of a priority and a usage history of the plurality of electronic devices.

In addition, the determining of the schedule information may include: inactivating one of the active electronic devices by comparing a priority of the active electronic devices with a priority of the at least one electronic device corresponding to the activation request; activating the at least one electronic device corresponding to the activation request; predicting a time at which the at least one electronic device corresponding to the activation request is inactivated based on a usage history of the at least one electronic device corresponding to the activation request; and determining schedule information to reactivate the inactivated electronic device according to a result of comparing the priorities by using the predicted time.

According to an example embodiment, when the system includes at least one other power management device, the method of operating the power management device for controlling the state of the plurality of electronic devices included in the system may further include: receiving power consumption-related information of electronic devices managed by the at least one other power management device from the at least one other power management device, wherein the determining of the schedule information may determine the schedule information based on power consumption of the electronic devices managed by the at least one other power management device, the predicted power consumption, and the current power consumption of the system.

According to an example embodiment, the method of operating the power management device for controlling the state of the plurality of electronic devices included in the system may further include: transmitting, to the at least one electronic device, a control signal for activating the at least one electronic device, based on the schedule information.

According to an example embodiment, the method of operating the power management device for controlling the state of the plurality of electronic devices included in the system may further include: monitoring a variation of the current power consumption of the system when the at least one electronic device is activated; comparing the variation with the predicted power consumption; and determining whether to update the schedule information according to a result of the comparing.

According to an example embodiment, the method of operating the power management device for controlling the state of the plurality of electronic devices included in the system may further include: comparing current power consumption and average power consumption of the at least one electronic device, determining occurrence of a defect in the at least one electronic device according to a result of the comparing; and providing notification information on the occurrence of a defect according to a result of the determining.

According to an example embodiment, when the system includes at least one non-intelligent electronic device, the method of operating the power management device for controlling the state of the plurality of electronic devices included in the system may further include: obtaining power consumption of the non-intelligent electronic devices, and the determining of the schedule information may be based on the power consumption of the non-intelligent electronic devices, the predicted power consumption, and the current power consumption of the system.

According to an example embodiment, the method of operating the power management device for controlling the state of the plurality of electronic devices included in the system may further include: providing a user interface including the schedule information of the at least one electronic device corresponding to the activation request.

According to an example embodiment, the method of operating the power management device for controlling the state of the plurality of electronic devices included in the system may further include: updating the schedule information in response to a user input through the user interface.

A power management device for controlling a state of a plurality of electronic devices included in a system may include: a communicator for receiving an activation request to activate at least one electronic device from among the plurality of electronic devices, and a controller for predicting power consumption of the at least one electronic device, and determining schedule information to activate the at least one electronic device based on the predicted power consumption and current power consumption of the system.

According to an example embodiment, if a sum of the predicted power consumption and the current power consumption of the system is greater than a predetermined threshold power, then the controller may determine the schedule information that inactivate at least one of the active electronic devices included in the system and activate the at least one electronic device corresponding to the activation request based on at least one of a priority and a usage history of the plurality of electronic devices.

In addition, the controller may compare a priority of the active electronic devices with a priority of the at least one electronic device corresponding to the activation request and thus inactivating one electronic device from among the active electronic devices; may activate the at least one electronic device corresponding to the activation request; may predict a time at which the electronic device corresponding to the activation request is inactivated based on a usage history of the at least one electronic device corresponding to the activation request; and may determine schedule information to reactivate the inactivated electronic device according to a result of comparing the priorities by using the predicted time.

According to an example embodiment, when the system includes at least one other power management device, the communicator may receive power consumption-related information of electronic devices managed by the at least one other power management device from the at least one other power management device, wherein the controller may determine the schedule information based on the power consumption of the electronic devices managed by the at least one other power management device, the predicted power consumption, and the current power consumption of the system.

According to an example embodiment, the controller may generate a control signal for activating the at least one electronic device based on the schedule information, and the communicator may transmit the generated control signal to the at least one electronic device.

According to an example embodiment, the controller may monitor a variation of the current power consumption of the system when the at least one electronic device is activated, may compare the variation of the power consumption with the predicted power consumption, and may determine whether to update the schedule information.

According to an example embodiment, the controller may determine occurrence of a defect in the at least one electronic device by comparing current power consumption and average power consumption of the at least one electronic device, and may generate notification information on the occurrence of a defect according to a result of the determining. The power management device may further include a user interface unit providing the notification information.

According to an example embodiment, when the system includes at least one non-intelligent electronic device, the controller may obtain power consumption of the non-intelligent electronic devices, and may determine the schedule information based on the power consumption of the non-intelligent electronic devices, the predicted power consumption, and the current power consumption of the system.

According to an example embodiment, the power management device may further include a user interface unit providing the schedule information of the at least one electronic device corresponding to the activation request.

According to an example embodiment, provided is a non-transitory computer-readable recording medium having recorded thereon a program for executing a method of operating a power management device including: obtaining an activation request to activate at least one electronic device from among a plurality of electronic devices included in a system, predicting power consumption of the at least one electronic device corresponding to the activation request, and determining schedule information to activate the at least one electronic device corresponding to the activation request based on the predicted power consumption and current power consumption of the system.

The disclosed example embodiments will be described with reference to the accompanying drawings in such a manner that the example embodiments may be easily carried out by those of ordinary skill in the art. In this regard, the present invention may have different forms and should not be construed as being limited to the descriptions set forth herein. In addition, descriptions of well-known functions and constructions will be omitted for clarity and conciseness, and similar reference numerals are assigned to similar elements throughout the specification.

Hereinafter, the present invention will be described in detail with reference to the accompanying drawings.

FIG. 1 is a view of a system including a power management device and electronic devices, according to an example embodiment.

Referring to FIG. 1, according to an example embodiment, a system 103 includes electronic devices 102 and a power management device 100 arranged in a predetermined space. For example, the system 103 may include electronic devices and the power management device 100 arranged in homes, offices, buildings, aggregate buildings, and the like.

According to an example embodiment, the system 103 may include a power supply that provides power to the electronic devices 102. For example, the power supply may include a battery, a generator, and the like that store, process, and supply externally provided power. The system 103 may provide power to the electronic devices 102 through the power supply. For example, the electronic devices 102 may be powered directly from the power supply, or may be powered through the power management device 100.

The electronic devices 102 may include, but are not limited to, household appliances such as display devices, computers, security devices, audio systems, refrigerators, washing machines, dishwashers, and lighting control systems. For example, the electronic devices 102 may include office equipment, public equipment, and the like.

According to an example embodiment, the electronic devices 102 may include an intelligent electronic device and a non-intelligent electronic device. Here, the intelligent electronic device may be an electronic device whose state (e.g., an active or inactive state) can be controlled by the power management device 100. The non-intelligent electronic device may be an electronic device whose state cannot be controlled by the power management device 100. For example, the non-intelligent electronic device may not receive a control signal from the power management device 100.

According to an example embodiment, the power management device 100 may control a state of the electronic devices 102 based on power consumption of the system 103. The power management device 100 may control the state of the electronic devices 102 to maintain the power consumption of the system 103 within a predetermined range.

For example, the power management device 100 may obtain an activation request or inactivation request from the electronic devices 102 through a network 104. The power management device 100 may also generate a control signal for changing a state of an electronic device or a control signal including schedule information for changing a state of an electronic device based on the power consumption of the system 103. The power management device 100 may control a state of the electronic devices 102 by transmitting the generated control signals to the electronic devices 102.

Alternatively, when the power supply supplies power to the electronic devices 102 through the power management device 100, the power management device 100 may include a control device (e.g., a switch, etc.) for controlling the power supplied to the electronic devices 102. The power management device 100 may control a state of the electronic devices 102 by controlling the amount of power supplied to the electronic devices 102 through the control device.

Alternatively, the power management device 100 may control a state of the electronic devices 102 by controlling a power supply control switch or the like provided in a smart outlet. The smart outlet may include a communication device for receiving a control signal from the power management device 100.

According to an example embodiment, the power management device 100 may use power line communication (PLC) to remotely control a state of the electronic devices 102. The network 104 in the system 103 may be omitted.

The power management device 100 may be a mobile electronic device. For example, the power management device 100 may be a cellular phone, a personal digital assistant (PDA), a notebook computer, a tablet personal computer (PC), a wearable device, or other multi-functional communication/entertainment device. Alternatively, the power management device 100 may be a non-mobile electronic device connected to the power supply and the electronic devices 102.

Meanwhile, the power management device 100 may be implemented in at least one of the electronic devices 102. For example, a display 105 of FIG. 1 may perform a function of the power management device 100 of the system 103.

According to an example embodiment, the system 103 may include a plurality of power management devices. For example, the plurality of power management devices included in the system 103 may control a state of the electronic devices 102 in a hierarchy in which the power management device 100 includes at least one sub-power management device. Alternatively, the plurality of power management devices included in the system 103 may control a state of an electronic device in a distributed manner in an Internet of Things (IoT) environment.

The network 104 may be implemented in a wired network such as a local area network (LAN), or any type of wireless network such as a mobile communication network, a Wi-Fi, or a satellite communication network. For example, the network 104 may include ZIGBEE communications (e.g., a self-organizing, ad-hoc protocol), BLUETOOTH communications (e.g., a short-range, packet-based protocol), or ultra-wideband (UWV) communications. In addition, the network 104 may include an IoT environment.

FIG. 2 is a flowchart of an operation method of a power management device, according to an example embodiment.

Referring to FIG. 2, in operation 202, the power management device 100 obtains an activation request to activate at least one electronic device from among the plurality of electronic devices 102 included in the system 103. Here, the activation may be to change a state of the at least one electronic device in an inactive state to an active state.

The state of the electronic device may be classified into G0 (in operation), G1 (standby mode), G2 (soft termination), and G3 (mechanical termination) states according to an advanced configuration and power interface (ACPI) specification. The active state may correspond to the G0 state, and the inactive state may correspond to the G1, G2, or G3 state, respectively.

In more detail, the active state may include a state in which the electronic device is turned on, or the G0 state in which some functions of the electronic device is in operation. For example, an active state of a display may be a state of reproducing video and/or audio content. In addition, the inactive state may include a state in which the electronic device is turned off and thus consumes no power at all (e.g., the G3 state), the G2 state, or the G1 state. For example, an inactive state of a display may be a power-off state or a hibernation state.

Furthermore, an activation request to the power management device 100 may be obtained from the power management device 100 or the electronic devices 102 included in the system 103. For example, the activation request may be a control signal (or data) transmitted from one of the electronic devices 102 to the power management device 100 based on a user input entered into the one electronic device. Alternatively, the activation request may be obtained through a user interface provided by the power management device 100.

Alternatively, the power management device 100 may obtain an activation request from an electronic device (not shown) outside the system 103. Here, the electronic device outside the system 103 may be previously registered in the power management device 100 and may provide a user interface for controlling the power management device 100. For example, an external electronic device may send an activation request to the power management device 100 based on a user input entered through a user interface.

In operation 204, the power management device 100 predicts power consumption of at least one electronic device. The at least one electronic device may be at least one electronic device corresponding to the activation request.

According to an example embodiment, the power management device 100 may predict the power consumption of the at least one electronic device corresponding to the activation request based on a usage history of the electronic device. Hereinafter, for convenience of explanation, the power consumption predicted by the power management device 100 is referred to as a 'predicted power consumption'.

According to an example embodiment, the power management device 100 may monitor power consumption and power usage time of the electronic devices 102. For example, the power management device 100 may monitor current power consumption of the system 103, current power consumption per electronic device, peak power consumption, time to activate (or inactivate) an electronic device, and so on. In addition, the power management device 100 may analyze the monitored information and obtain a usage history of the electronic devices 102. For example, the power management device 100 may analyze the monitored information to obtain accumulated power consumption of a system and an electronic device, average power consumption, power consumption per hour, latest usage time per electronic device, average usage time, and so on. In addition, the power management device 100 may store and/or manage information on the obtained usage history.

The power management device 100 may use average power consumption and average usage time of an electronic device for a predetermined period to determine predicted power consumption of an electronic device obtained an activation request. For example, when an activation request for a display is obtained, the power management device 100 may determine predicted power consumption of the display using average power consumption and average usage time of the display for one week.

Meanwhile, in the above description, the power management device 100 monitors power consumption and power usage time of the electronic devices 102, but the present invention is not limited thereto. For example, the power management device 100 may receive power consumption and power usage time monitored by a power supply, a smart outlet, or the electronic devices 102.

Furthermore, according to an example embodiment, the power management device 100 may determine predicted power consumption of an electronic device using a look-up table stored in or outside the power management device 100. The look-up table may include an identification value, average power consumption, average usage time, and the like of the electronic devices 102. In addition, the look-up table may be updated at regular time intervals (e.g., 24 hour intervals, weekly intervals, etc.). Thus, once the activation request is obtained, the power management device 100 may determine predicted power consumption of an electronic device corresponding to the activation request by accessing the look-up table.

Alternatively, the power management device 100 may receive predicted power consumption from the electronic device corresponding to the activation request. For example, an activation request received by the power management device 100 from a display may include a predicted power consumption value of the display.

Meanwhile, the power management device 100 may update predicted power consumption each time an activation request is obtained. Therefore, the updated predicted power consumption may exclude predicted power consumption of an electronic device that has been activated at the time of updating.

If power consumption of the system 103 exceeds the amount of power provided from the outside, a power supply may shut off power supplied to the system 103. Accordingly, the power management device 100 may perform an operation to control a state (e.g., an active or inactive state) of an electronic device that transmitted an activation or inactivation request to prevent the power supply from the shutting off power supply.

In operation 206, the power management device 100 determines schedule information to activate at least one electronic device based on predicted power consumption and current power consumption of the system 103. The at least one electronic device may be at least one electronic device corresponding to the activation request. Furthermore, the current power consumption of the system 103 may be real-time power consumption consumed by the electronic devices 102 of the system 103.

In addition, the schedule information may include at least one of information about an order and information about a time of activating electronic devices corresponding to an activation request.

According to an example embodiment, the power management device 100 may compare total power consumption, which is a sum of the current power consumption of the system 103 and the predicted power consumption, with threshold power. The threshold power may be determined according to at least one of a maximum power capacity indicating maximum power supplied from the outside to the system 103 and a safety index.

When the total power consumption of the system 103 exceeds the threshold power, the power management device 100 may determine schedule information that inactivates an active electronic device included in the system 103 and activates an electronic device corresponding to an activation request, based on at least one of a priority and the usage history of the electronic devices 102.

For example, the power management device 100 may compare a priority of a first electronic device corresponding to an activation request with a priority of active electronic devices, and may determine schedule information that inactivates a second electronic device having a lower priority than the first electronic device and activates the first electronic device from among the active electronic devices. If the priority of the active electronic devices is equal to the priority of the first electronic device, then the power management device 100 may determine schedule information that inactivates a third electronic device having the longest average usage time from among the active electronic devices and activates the first electronic device, based on a usage history of the active electronic devices.

Alternatively, when an activation request is obtained from two or more electronic devices having the same priority, the power management device 100 may determine schedule information to activate one of the electronic devices first, according to a usage history of the electronic devices from which the activation request is obtained. For example, based on average power consumption of each electronic device, the power management device 100 may determine schedule information that first activates an electronic device with the smallest average power consumption. Alternatively, when an activation request is obtained from two or more electronic devices having the same priority, the power management device 100 may determine schedule information that first activates an electronic device with the shortest average usage time based on average usage time of the electronic devices. A method of determining schedule information by the power management device 100 will be described in detail later below with reference to FIGS. 3 to 5.

Furthermore, the power management device 100 may also control a state (e.g., an active or inactive state) of the electronic devices 102 in the system 103, based on schedule information. According to an example embodiment, the power management device 100 may control a state of the electronic devices 102 by transmitting a control signal to the electronic devices 102, based on the schedule information. Alternatively, the power management device 100 may control a state of the electronic devices 102 by transmitting a control signal to a smart outlet or a power supply, based on the schedule information.

According to an example embodiment, the power management device 100 may provide a user interface including schedule information. Furthermore, the power management device 100 may update, change, and delete the schedule information in response to a user input through the user interface.

Meanwhile, when total power consumption of the system 103 is equal to or less than threshold power of the system 103, the power management device 100 may transmit a control signal, which activates a state of an electronic device corresponding to an activation request, to the electronic device.

Meanwhile, when the system 103 includes at least one non-intelligent electronic device according to an example embodiment, the power management device 100 may control a state of the non-intelligent electronic device using a control device, such as a smart outlet or a switch connected to a power supply. The controlling of a state of the non-intelligent electronic device may mean that the power management device 100 controls the amount of power supplied to the non-intelligent electronic devices using the control device. The power management device 100 may perform operations 202 to 206 to shut off or supply power to the non-intelligent electronic device according to the schedule information.

Alternatively, according to an example embodiment, if the power management device 100 does not include a control device for controlling power supplied to non-intelligent electronic devices, the power management device 100 may assume the non-intelligent electronic devices to be in an active state. Thus, in operation 206, the power management device 100 may determine schedule information based on predicted power consumption, the current power consumption of the system 103, and average power consumption of the non-intelligent electronic devices. Meanwhile, the average power consumption of the non-intelligent electronic devices may be monitored by the power management device 100. As such, the power management device 100 may prevent the power consumption of the system 103 from exceeding threshold power even when the system 103 cannot directly control a state of an electronic device.

FIG. 3 is a flowchart of a method, performed by a power management device, of determining schedule information, based on a priority, according to an example embodiment.

Referring to FIG. 3, in operation 302, the power management device 100 may determine whether total power consumption exceeds threshold power. The total power consumption may be a sum of predicted power consumption of an electronic device corresponding to an activation request and the current power consumption of the system 103.

According to an example embodiment, the power management device 100 may determine the threshold power based on at least one of a maximum power capacity of the system 103 and a safety index. The maximum power capacity may be obtained from a power supply or an external server (e.g., a server operated by the power management corporation). The safety index may be a default value set in the power management device 100 or a value determined by a user input.

For example, when the safety index is 10%, the power management device 100 may determine 90% of the maximum power capacity of the system 103 as the threshold power. According to an example embodiment, when a power supply includes a protection device such as a circuit breaker or a fuse, the maximum power capacity may have a value at which a function of the protection device is activated.

According to an example embodiment, the power management device 100 may determine threshold power according to a user input. According to an example embodiment, the power management device 100 may provide a user interface that determines the threshold power. Alternatively, the power management device 100 may also receive threshold power determined by a user input received from another electronic device.

According to an example embodiment, the power management device 100 may compare total power consumption with threshold power to determine whether the total power consumption exceeds the threshold power.

If the total power consumption exceeds the threshold power, the power management device 100 may compare a priority of active electronic devices with a priority of an electronic device corresponding to an activation request.

According to an example embodiment, the power management device 100 may allocate priorities to the electronic devices 102 included in the system 103 based on a predetermined criterion. For example, the power management device 100 may allocate priorities according to characteristics of the system 103, frequency of obtaining an activation request per electronic device, preference of an electronic device according to a user input, characteristics of an electronic device, a function of an electronic device, average power consumption of an electronic device, or a combination thereof. The characteristics of the system may include information about an environment in which the system is located (e.g., a house, a kitchen, a company, etc.). Furthermore, the characteristics of the electronic device may include information on whether or not an active electronic device can be changed to an inactive electronic device during a predetermined operation.

For example, the power management device 100 may allocate priorities to the electronic devices 102 according to the characteristics of the system 103. If the system 103 is located in a home, the power management device 100 may allocate a high priority (e.g., a first rank) to a household appliance such as a dishwasher or a washing machine. Meanwhile, if the system 103 is located in an office, the power management device 100 may allocate a low priority (e.g., a tenth rank) to the household appliance.

Alternatively, the power management device 100 may allocate priorities according to functions of the electronic devices 102. For example, the power management device 100 may allocate an identical priority (e.g., a third order) to a dishwasher and a washing machine since the dishwasher and the washing machine have the same cleaning function.

In operation 304, the power management device 100 may compare a priority of active electronic devices with a priority of an electronic device corresponding to an activation request, based on a predetermined priority. For example, the power management device 100 may compare a priority of the active washing machine with a priority of a display, which is an electronic device corresponding to an activation request.

In operation 306, the power management device 100 may determine schedule information to activate the electronic device corresponding to the activation request based on a result of comparing the priorities in operation 304.

According to an example embodiment, if a priority of an active second electronic device is lower than a priority of a first electronic device corresponding to an activation request, the power management device 100 may determine schedule information that inactivates the second electronic device having a lower priority. For example, when the priority of the display, which is an electronic device corresponding to an activation request, is 'first rank' and the priority of the active washing machine is 'third rank', the power management device 100 may inactivate the washing machine and determine schedule information to activate the display.

Meanwhile, the power management device 100 may update the schedule information each time a new activation request is obtained. For example, the power management device 100 may obtain an activation request for a display having a higher priority than that of the dishwasher when an activation request for the dishwasher is pending according to the schedule information. The power management device 100 may update the schedule information to determine schedule information to activate the display first.

Meanwhile, if the total power consumption is equal to or less than the threshold power in operation 302, the power management device 100 may transmit to each electronic device a control signal that sequentially activates electronic devices corresponding to an activation request according to a priority.

As described above, the power management device 100 may determine schedule information for efficiently performing a function of a high-priority electronic device without exceeding the maximum power capacity of the system 103.

Figure 4:
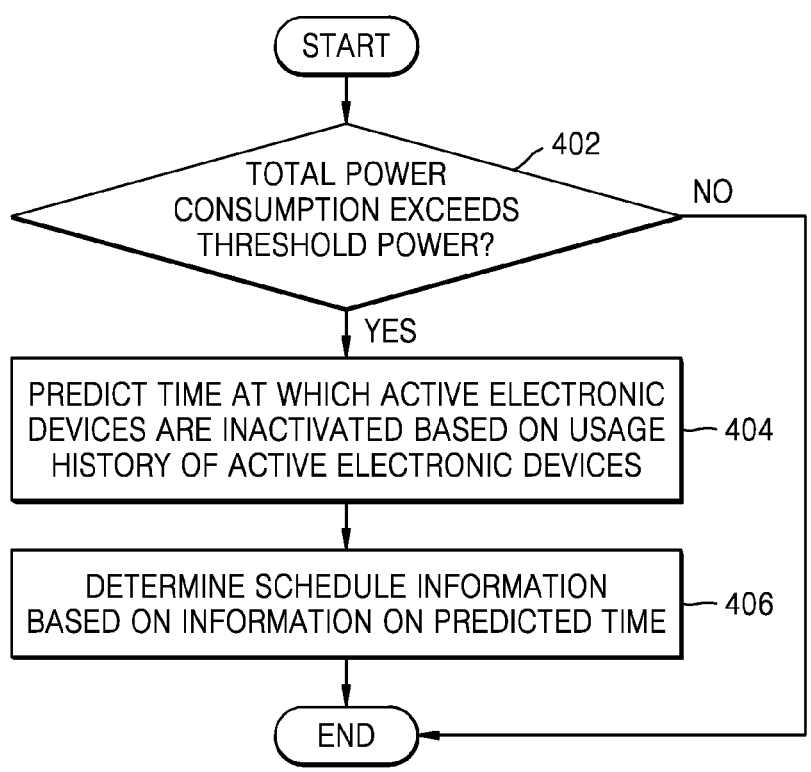
FIG. 4 is a flowchart of a method, performed by a power management device, based on a usage history, according to an example embodiment.

FIG. 4 is a flowchart of a method, performed by a power management device, of determining schedule information, based on a usage history, according to an example embodiment.

Referring to FIG. 4, the power management device 100 may predict a time at which active electronic devices are inactivated based on a usage history of the active electronic devices and may determine schedule information including the predicted time information.

In operation 402, the power management device 100 may determine whether total power consumption of the system 103 exceeds threshold power. Since an example embodiment of operation 302 of FIG. 3 may be applied to operation 402, a detailed description thereof will not be given herein.

If the total power consumption exceeds the threshold power, then in operation 404, the power management device 100 may predict the time at which the active electronic devices are inactivated based on the usage history of the active electronic devices.

As described above in FIG. 2, the usage history may include average usage time, average power consumption, and latest usage start time.

The power management device 100 may obtain relationship information among electronic devices, state information of electronic devices by time, time information at which electronic devices are activated, and the like, based on the usage history of the electronic devices. The relationship information among electronic devices may indicate a relationship in which, when an electronic device is inactivated, another electronic device is activated.

According to an example embodiment, the power management device 100 may predict the time at which active electronic devices are inactivated based on the state information of electronic devices by time. For example, with respect to a washing machine becoming active from 10 pm, the power management device 100 may predict that the active washing machine will be inactivated at 11 pm based on state information of the washing machine by time.

Alternatively, the power management device 100 may predict the time at which the active electronic device is inactivated based on the average usage time per electronic device and the latest usage start time. For example, the power management device 100 may predict that the active washing machine will be inactivated at 11:20 pm based on average usage time (e.g., 30 minutes) and latest usage start time (e.g., 10:40 pm) of a vacuum cleaner.

In operation 406, the power management device 100 may determine schedule information including information about the time at which the active electronic device is inactivated.

According to an example embodiment, the power management device 100 may select one of active electronic devices and determine schedule information to activate an electronic device corresponding to an activation request when the selected electronic device is predicted to be inactivated. The power management device 100 may select one of the active electronic devices by comparing a time at which active electronic devices are predicted to be inactivated with current time.

For example, when an activation request is obtained from a display at 10:50 pm, the power management device 100 may compare a time at which active washing machine and vacuum cleaner are predicted to be inactivated with current time (i.e., 10:50 pm). In addition, the power management device 100 may inactivate the washing machine at 11 pm and determine schedule information to activate the display at 11 pm. Also, according to the schedule information, the power management device 100 may transmit a control signal to the washing machine to change the washing machine to an inactive state at 11 pm, and transmit a control signal to the display to change the display to an active state.

Meanwhile, the power management device 100 may provide a user interface including schedule information for inactivating the washing machine at 11 pm and activating the display at 11 pm. The power management device 100 may change the schedule information to inactivate the washing machine at 11:10 pm and activate the display at 11:10 pm in response to a user input to the user interface.

Meanwhile, if the total power consumption is equal to or less than the threshold power in operation 402, the power management device 100 may transmit a control signal to activate an electronic device corresponding to the activation request to the electronic device.

Meanwhile, in the above description, the power management device 100 determines the schedule information by predicting the time at which the active electronic device is inactivated, but the present invention is not limited thereto. According to an example embodiment, the power management device 100 may determine the schedule information based on a relationship between the active electronic device and the electronic device corresponding to the activation request.

For example, based on average power consumption of each electronic device, the power management device 100 may determine schedule information to inactivate an active lighting device and activate a security device based on a relationship between the lighting device and the security device.

Figure 5:
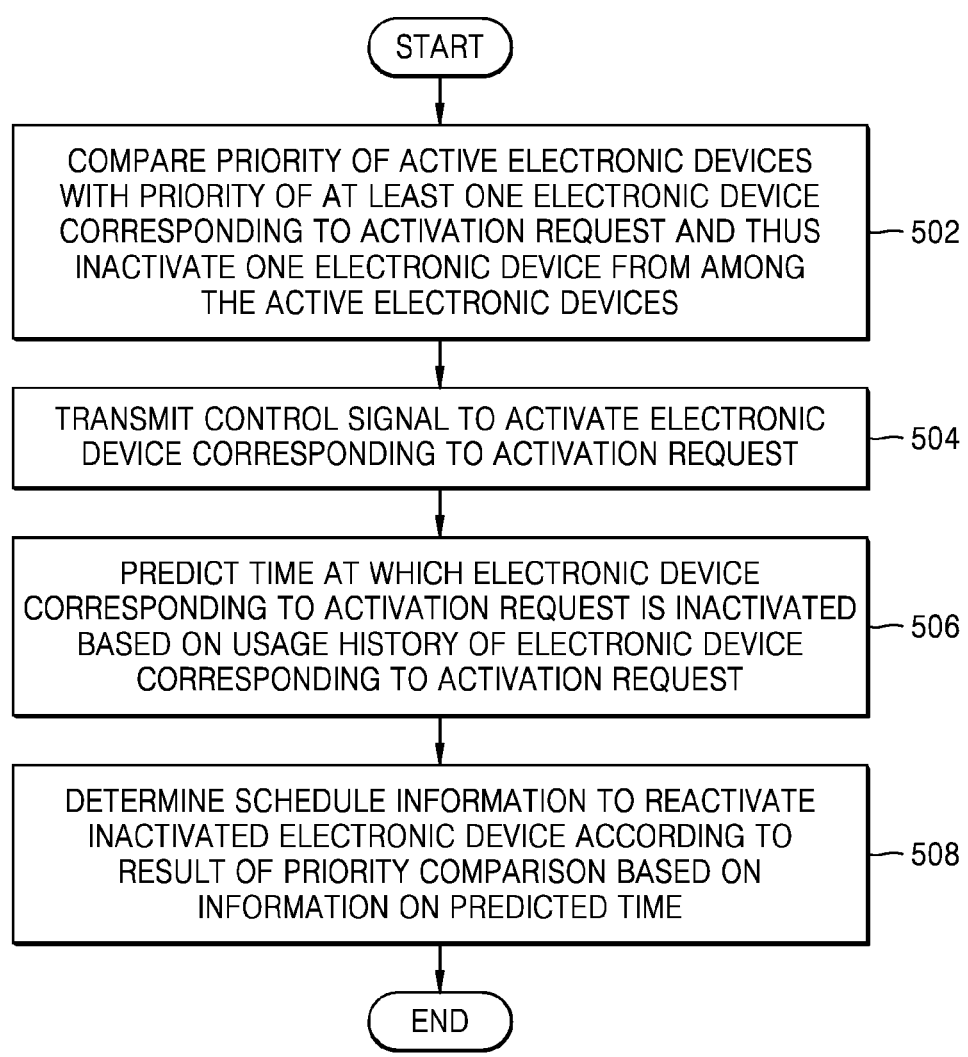
FIG. 5 is a flowchart of a method, performed by a power management device, of determining schedule information, based on a priority and a usage history, according to an example embodiment.

FIG. 5 is a flowchart of a method, performed by a power management device, of determining schedule information, based on a priority and a usage history, according to an example embodiment.

Referring to FIG. 5, in operation 502, the power management device 100 may compare a priority of active electronic devices with a priority of at least one electronic device corresponding to an activation request and thus inactivate one electronic device from among the active electronic devices.

According to an example embodiment, the power management device 100 may extract electronic devices having lower priority than a first electronic device corresponding to the activation request from among the active electronic devices. In addition, the power management device 100 may inactivate a second electronic device having the lowest priority from among the extracted electronic devices. For example, the power management device 100 may generate a control signal that inactivates the second electronic device, and may transmit the generated control signal to the second electronic device. For example, when an activation request for a display is obtained, the power management device 100 may inactivate a vacuum cleaner having lower priority than the display from among the active electronic devices.

In operation 504, the power management device 100 may transmit a control signal to an electronic device corresponding to the activation request, to activate the electronic device corresponding to the activation request.

According to an example embodiment the power management device 100 may generate a control signal to activate the first electronic device corresponding to the activation request, and may transmit the generated control signal to the first electronic device. For example, the power management device 100 may transmit an activation control signal to the display.

In operation 506, the power management device 100 may predict a time at which the electronic device corresponding to the activation request is inactivated based on a usage history of the electronic device corresponding to the activation request. For example, the power management device 100 may predict the time at which the electronic device is inactivated based on state information of electronic devices by time, average usage time for each electronic device, or latest usage start time.

For example, the power management device 100 may predict that the display will be inactivated after a predetermined time (or at a specific time) based on usage time information for each electronic device of the display.

In operation 508, the power management device 100 may determine schedule information to reactivate an inactivated electronic device according to a result of comparing the priorities based on information on the predicted time.

According to an example embodiment, the power management device 100 may determine schedule information to reactivate the inactivated electronic device in operation 502 at the time predicted in operation 506. For example, the power management device 100 may determine schedule information to reactivate the vacuum cleaner at the time when the display is predicted to be inactive.

Figure 6:
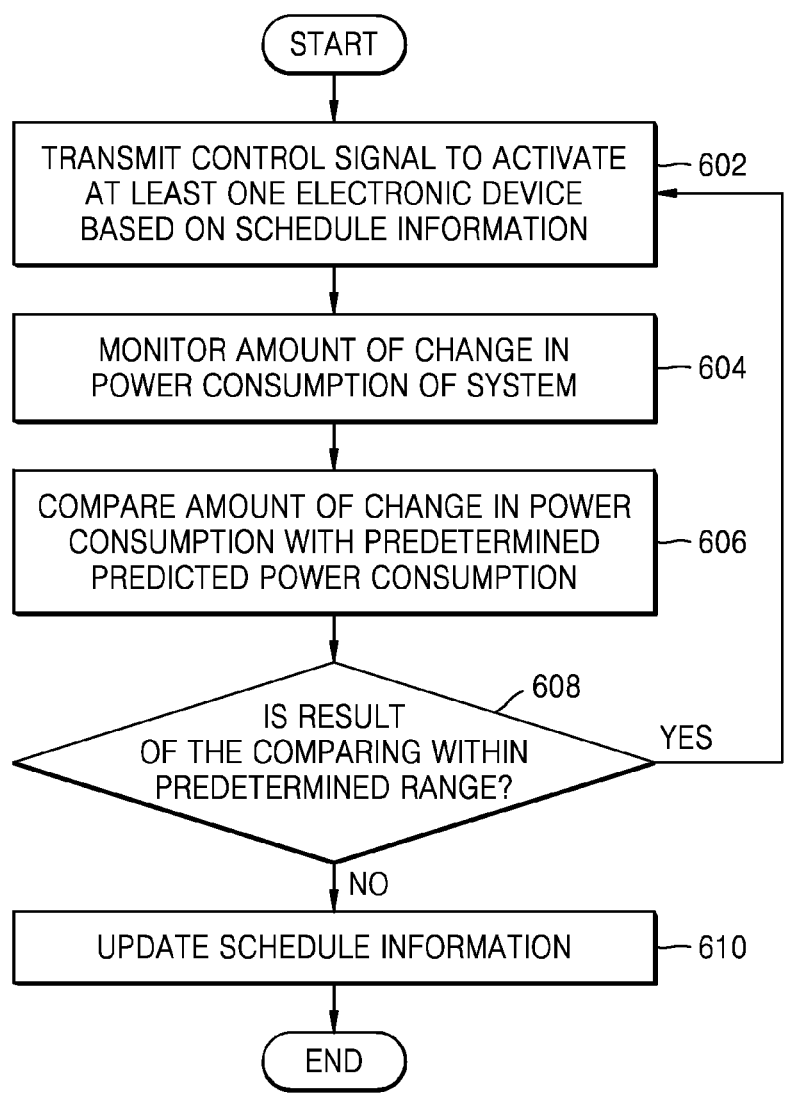
FIG. 6 is a flowchart of a method, performed by a power management device, of updating schedule information, according to an example embodiment.

FIG. 6 is a flowchart of a method, performed by a power management device, of updating schedule information, according to an example embodiment.

In operation 602, the power management device 100 may transmit a control signal to at least one electronic device, to activate the at least one electronic device based on the schedule information.

In operation 604, the power management device 100 may monitor the amount of change in power consumption of the system 103.

For example, the power management device 100 may determine a difference in power consumption of the system 103 before and after activation of at least one electronic device as the amount of change in power consumption of the system 103.

In operation 606, the power management device 100 may compare the amount of change in the power consumption of the system 103 with predetermined predicted power consumption.

For example, the power management device 100 may compare the predicted power consumption determined in operation 204 of FIG. 2 with the amount of change in the power consumption of the system to determine schedule information of an electronic device.

For example, after transmitting the control signal to the display, the power management device 100 may compare the predetermined predicted power consumption with the difference in power consumption of the system 103 before and after activation of the display.

In operation 608, the power management device 100 may determine whether a result of the comparing is within a predetermined range. For example, the predetermined range may be an error range (for example, +10% to −10%) with respect to the predicted power consumption. However, the present invention is not limited thereto, and the power management device 100 may determine the predetermined range based on a default value stored in the power management device 100 or a value set by a user.

If a result of the comparing is out of the predetermined range, in operation 610, the power management device 100 may update the schedule information.

Figure 7:
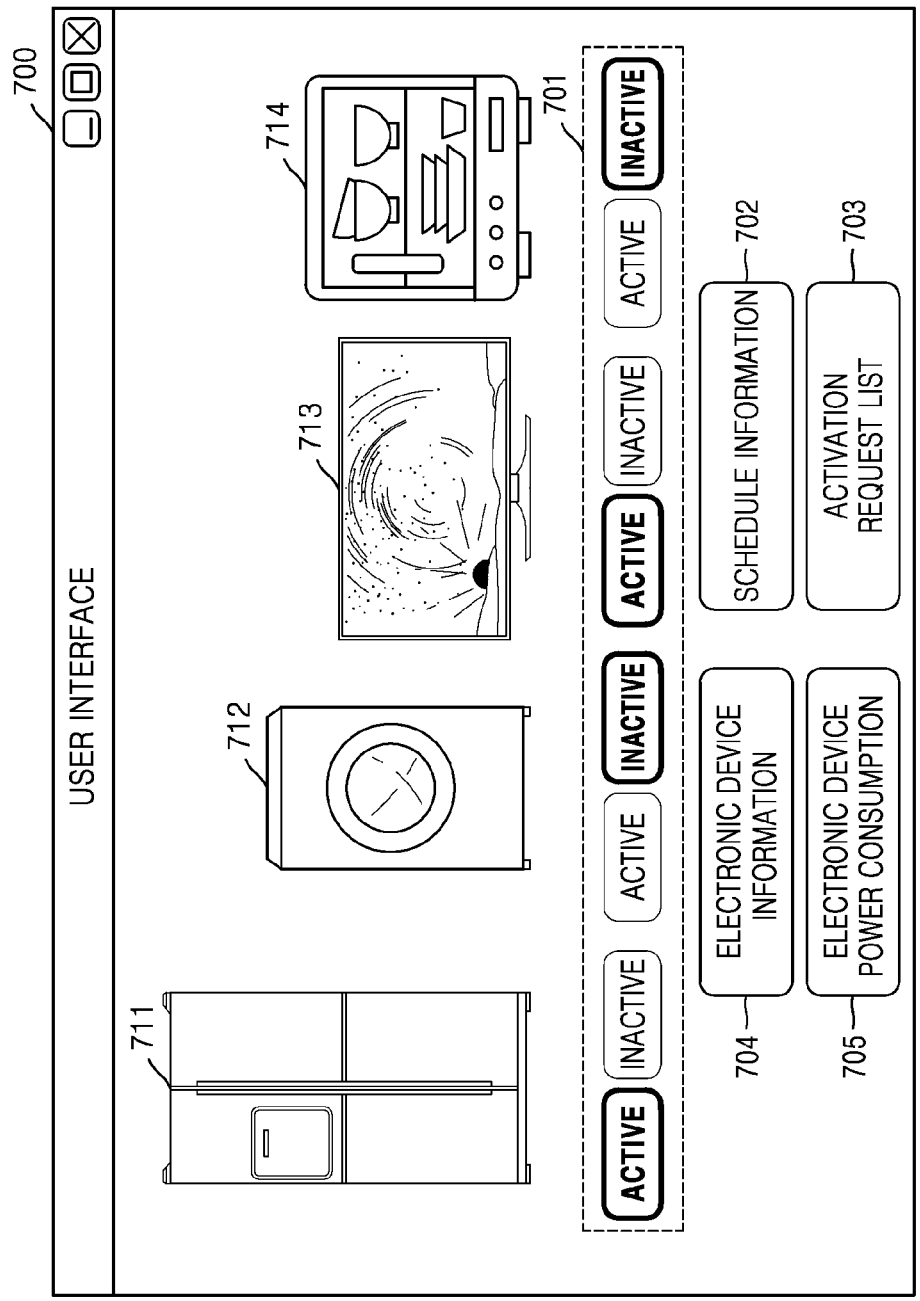
FIG. 7 is a view of a user interface screen provided by a power management device, according to an example embodiment.

FIG. 7 is a view of a user interface screen provided by the power management device 100, according to an example embodiment.

Referring to FIG. 7, the power management device 100 may provide a user interface 700 that includes information 701 on a current state of an electronic device in the system 103. For example, the information 701 on the current state of the electronic device may include an image indicating that a refrigerator and a display are active and a washing machine and a dishwasher are inactive.

In addition, the user interface 700 may include icons 711 to 714 that intuitively indicate the electronic devices 102, respectively. The power management device 100 may determine schedule information for changing a state of the electronic devices 102 corresponding to the icons 711 to 714 in response to a user input to the icons 711 to 714. For example, when a user input to the icon 711 of the display is received, the power management device 100 may determine schedule information for activating a state of the display.

In addition, the user interface 700 may include a 'schedule information' button image 702 for providing schedule information. When a user input to the 'schedule information' button image 702 is received, the power management device 100 may provide a text, an image, animation, or the like indicating the schedule information to a user. For example, the power management device 100 may provide a user with information about an identification value, a priority, an activation (or inactivation) order or time, etc. of an electronic device corresponding to an activation request.

Furthermore, the user interface 700 may include an 'activation request list' button image 703 for providing information about electronic devices that transmitted the activation request. When a user input to an 'activation request list' button image 703 is received, the power management device 100 may provide an activation request list. The activation request list may include, for example, obtained time of an activation request for a predetermined period, and an identification value of an electronic device that transmitted the activation request. In addition, the activation request list may provide a list of electronic devices that have transmitted activation requests by date, and may provide a list of electronic devices that are awaiting activation.

Furthermore, the user interface 700 may further include an 'electronic device information' button image 704 for providing information about electronic devices in the system 103. When a user input to the 'electronic device information' button image 704 is received, the power management device 100 may provide a text, an image, animation, or the like indicating information such as a start date of use, a usage period, power consumption efficiency, a life span, etc. of the electronic devices 102 included in the system 103.

Moreover, the user interface 700 may further include an 'electronic device power consumption' button image 705 for providing information on power consumption per electronic device. The power management device 100 may provide information related to power consumption of the electronic devices 102 included in the system 103 when a user input to the 'electronic device power consumption' button image 705 is received. For example, the power management device 100 may provide a text, an image, animation, or the like indicating information such as average power consumption, average consumption time, and the like for a predetermined period of each of the electronic devices 102 through the user interface 700.

According to an example embodiment, the user interface 700 may be provided from an external server (e.g., a cloud server, a web server, etc.). In addition, the user interface 700 may be provided in the form of a downloadable mobile application. Alternatively, the user interface 700 may be provided through the display in the power management device 100.

Figure 8:
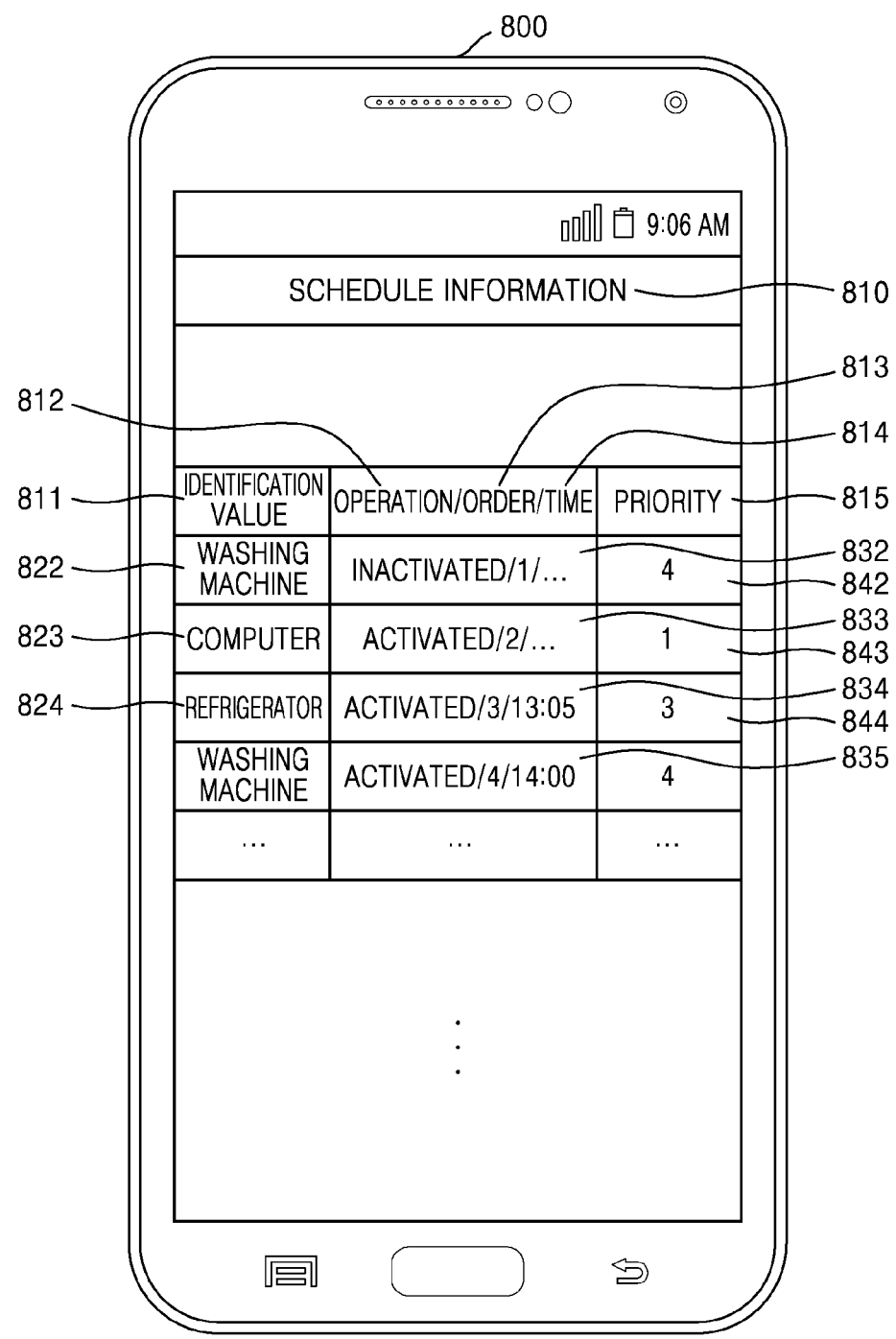
FIG. 8 is a view of a screen in which a power management device according to an example embodiment provides a user interface through a mobile device.

FIG. 8 is a view of a screen in which a power management device according to an example embodiment provides a user interface through a mobile device.

Referring to FIG. 8, the power management device 100 may provide a schedule information window 810 of the electronic devices 102 included in the system 103 through a mobile device 800. For example, the power management device 100 may transmit schedule information to the mobile device 800 to allow the mobile device 800 to provide a schedule information window 801 including the schedule information.

According to an example embodiment, the schedule information window 810 may include at least one of an identification value 811, a priority 815, an operation 812, an operation order 813, and operation time 814 of an electronic device. The identification value 811 of the electronic device may be a text, an image, or the like indicating a name or ID (e.g., the number '1') of the electronic device. For example, in FIG. 8, a 'computer' 823 indicates an identification value 823 of a computer device.

For example, the schedule information window 810 may provide identification information 822 of a washing machine, a priority 842 of the washing machine, and schedule information 832 indicating that the washing machine will be 'inactivated' in a 'first' order.

Furthermore, the schedule information window 810 may provide the identification value 823 of the computer device, a priority 843 of the computer device, and schedule information 833 indicating that the computer device will be 'inactivated' in a 'second' order.

In addition, the schedule information window 810 may provide identification value 824 of a refrigerator, a priority 844 of the refrigerator, and schedule information 834 indicating that the refrigerator will be 'inactivated' in a 'third' order.

Furthermore, the schedule information window 810 may provide schedule information 835 indicating that the washing machine will be 'activated' again at '14:00' in a 'fourth' order.

Meanwhile, the schedule information window 810 in FIG. 8 may be a text, an image, or animation provided on a screen converted by the user input to the 'schedule information' button image 702 in FIG. 7.

Figure 9:
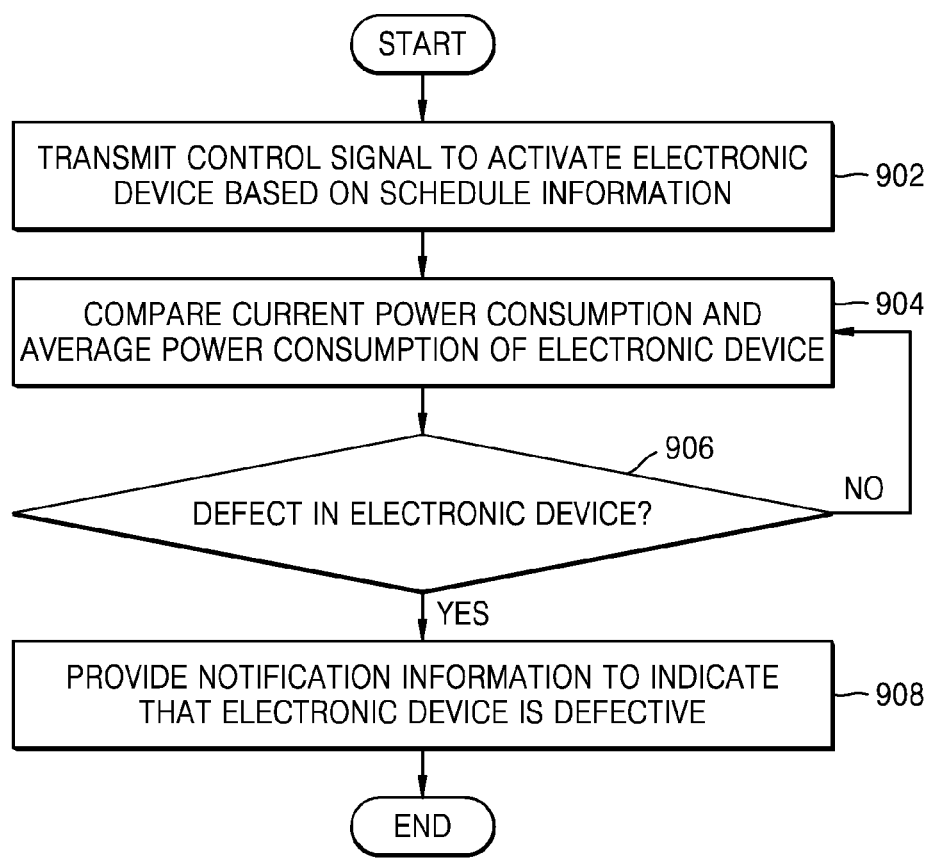
FIG. 9 is a flowchart of a method, performed by a power management device, of determining a defect in an electronic device included in a system and providing notification information, according to an example embodiment.

FIG. 9 is a flowchart of a method, performed by a power management device, of determining a defect in an electronic device included in a system and providing notification information, according to an example embodiment.

In operation 902, the power management device 100 may transmit a control signal to activate at least one electronic device based on obtained schedule information.

In operation 904, the power management device 100 may compare current power consumption and average power consumption of each electronic device.

According to an example embodiment the power management device 100 may obtain the current power consumption of each electronic device by monitoring power consumption of each electronic device. Furthermore, the power management device 100 may obtain the average power consumption of each electronic device based on a usage history.

In operation 906, the power management device 100 may determine whether there is a defect in at least one electronic device based on a result of the comparing.

For example, the power management device 100 may determine whether an active electronic device consumes too much or too little power based on a result of the comparing. For example, the power management device 100 may determine that the electronic device is defective if a difference between current power consumption and average power consumption of an electronic device exceeds a threshold (e.g., about 0.5 times average power consumption).

If it is determined that the electronic device is defective, in operation 908, the power management device 100 may provide visual or auditory notification information to indicate that the electronic device is defective. For example, notification information may include a pop-up message, a notification message, a warning sound, vibration, and the like.

Furthermore, the power management device 100 may provide defect information of an electronic device through a user interface. For example, the power management device 100 may provide a graphical user interface (GUI) indicating a defective electronic device, defect details, and the like. In addition, the power management device 100 may transmit defect information to a server providing a maintenance service providing server (e.g., an A/S reception server, etc.) of an electronic device in response to a user input to the GUI.

Figure 10:
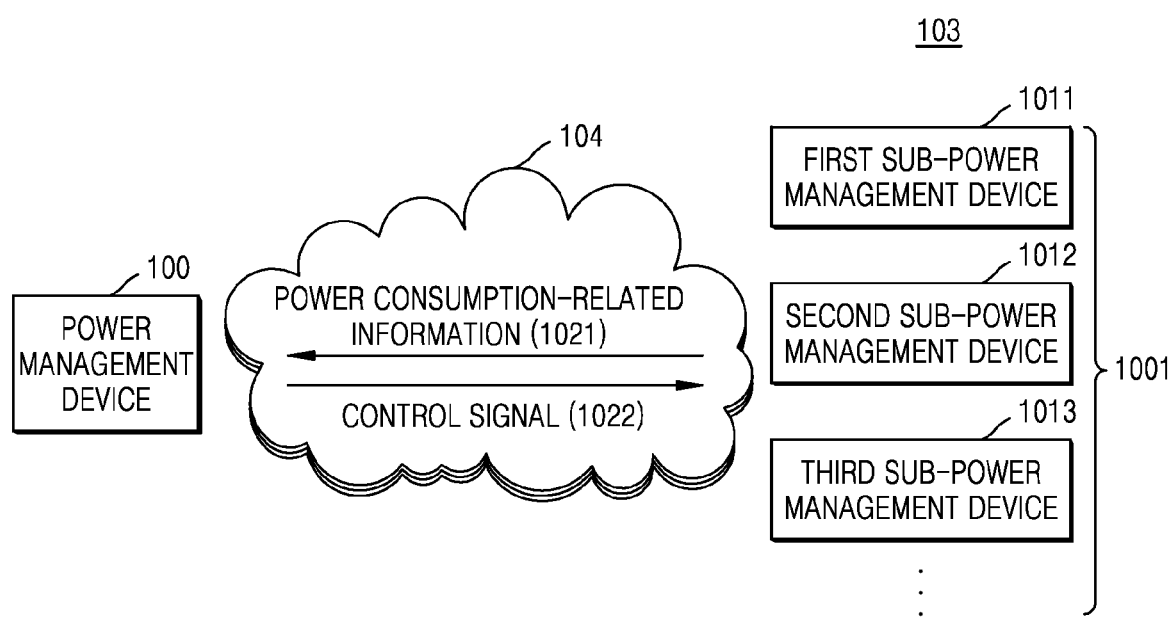
FIG. 10 is an exemplary view of a system including a plurality of power management devices.

FIG. 10 is an exemplary view of a system including a plurality of power management devices.

Referring to FIG. 10, according to an example embodiment, the system 103 may include a plurality of power management devices. Furthermore, a plurality of power management devices may be implemented in a hierarchical structure. The system 103 may include a power management device 100 located in an upper layer and first to third sub-power management devices 1011, 1012, and 1013 located in a lower layer.

The first to third sub-power management devices 1011 to 1013 may obtain information related to power consumption of some electronic devices of the system 103, and may transmit the power consumption-related information of the obtained electronic devices to the power management device 100. In addition, the power management device 100 may determine schedule information using power consumption-related information 1021 of electronic devices received from the first to third sub-power management devices 1011 to 1013. Furthermore, the power management device 100 may transmit a control signal 1022 according to the schedule information to the first to third sub-power management devices 1011 to 1013 through the network 104.

If the system 103 is a single building according to an example embodiment, the first sub-power management device 1011, the second sub-power management device 1012, and the third sub-power management device 1013 may be arranged for each floor of the building, and the power management device 100 may be arranged for controlling power consumption of the entire building system 103. Also, the power management device 100 may perform a gateway function in an IoT environment.

Meanwhile, a plurality of power management devices may not be implemented in a hierarchical structure. In this case, the power management device 100 may exchange power consumption-related information of some electronic devices in the system 103 controlled by other power management devices with other power management devices through the network 104. In addition, the power management device 100 may request another power management device to transmit power consumption-related information of electronic devices controlled by other power management devices through the network 104. For example, the power consumption-related information may include schedule information of electronic devices, monitored power consumption, state information (e.g., an active or inactive state) of an electronic device, and a usage history of an electronic device. Further, the power management device 100 may determine schedule information based on power-related information received from another power management device.

Meanwhile, the power management device 100 may detect whether another power management device exists in the system 103. For example, the power management device 100 may broadcast a signal (e.g., a beacon signal) that detects another power management device. In addition, the power management device 100 may obtain a signal broadcasted by another power management device. Alternatively, communication between the power management device 100 and another power management device may be performed in a distributed manner in an IoT environment.

Figure 11:
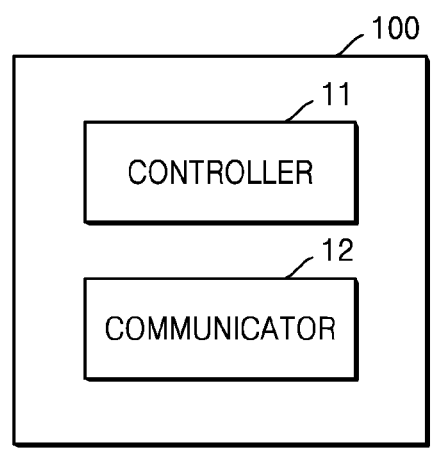
FIG. 11 is a configuration diagram of a power management device according to an example embodiment.
Figure 12:
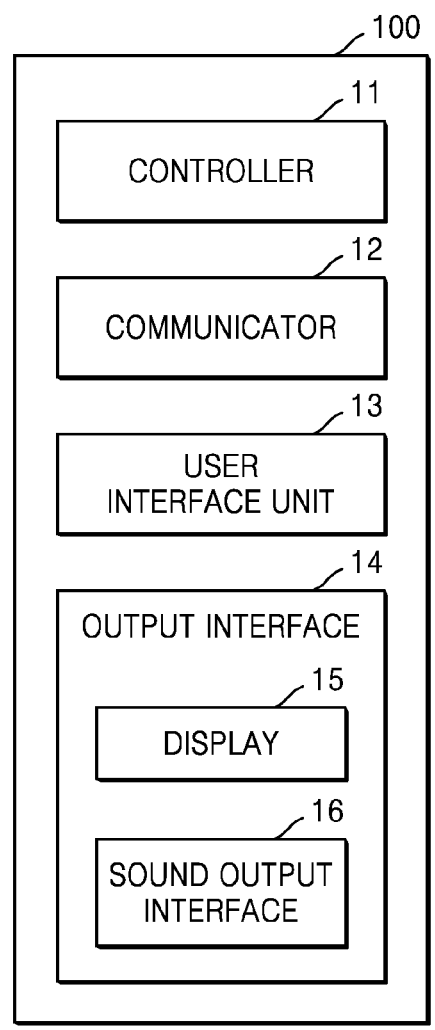
FIG. 12 is a configuration diagram of a power management device according to an example embodiment.

FIGS. 11 and 12 are configuration diagrams of a power management device according to an example embodiment.

As illustrated in FIG. 11, the power management device 100 includes a controller 11 and a communicator 12.

However, not all components shown in FIG. 11 are necessary components of the power management device 100. That is, the power management device 100 may include more or less components than the components shown in FIG. 11.

For example, as illustrated in FIG. 12, the power management device 100 according to an example embodiment may further include a user interface unit 13 and an output unit 14 in addition to the controller 11 and communicator 12.

The controller 11 may control general operations of the power management device 100. According to an example embodiment, the controller 11 may control the communicator 12, the user interface unit 13, and the output unit 14 to activate or inactivate a state of the electronic devices 102 included in the system 103.

In more detail, the controller 11 may obtain an activation request of an electronic device through the communicator 12 or the user interface unit 13. Also, the controller 11 may predict power consumption of an electronic device corresponding to the activation request. For example, the controller 11 may determine the predicted power consumption based on a usage history of the electronic device corresponding to the activation request. The controller 11 may monitor power consumption, power usage time, and the like of the electronic devices 102. In addition, the controller 11 may analyze the monitored information to obtain a usage history of the electronic devices 102.

In addition, the controller 11 may determine schedule information to activate at least one electronic device corresponding to an activation request based on predicted power consumption of the at least one electronic device corresponding to the activation request and current power consumption of the system 103. For example, the controller 11 may determine schedule information including at least one of information about an order and information about a time of activating electronic devices corresponding to the activation request.

Meanwhile, when the system 103 includes at least one non-intelligent electronic device according to an example embodiment, the controller 11 may control a state of the non-intelligent electronic device using a control device, such as a smart outlet or a switch connected to a power supply. For example, the controller 11 may shut off or supply power to the non-intelligent electronic device according to the schedule information.

If the controller 11 does not include a control device for controlling power supplied to non-intelligent electronic devices, the power management device 100 may assume the non-intelligent electronic devices to be in an active state. Thus, the controller 100 may determine schedule information based on predicted power consumption, the current power consumption of the system 103, and average power consumption of the non-intelligent electronic devices. Meanwhile, the average power consumption of the non-intelligent electronic devices may be obtained by the controller 11 monitoring power consumption of the non-intelligent electronic devices.

According to an example embodiment, the controller 11 may compare total power consumption, which is a sum of the current power consumption and the predicted power consumption, with threshold power. In addition, the controller 11 may determine the threshold power based on at least one of the maximum power capacity of the system 103 and a safety index.

When the total power consumption of the system 103 exceeds the threshold power, the controller 100 may determine schedule information that inactivates an active electronic device included in the system 103 and activates at least one electronic device corresponding to an activation request, based on at least one of a priority and the usage history of the electronic devices 102.

According to an example embodiment, the controller 11 may compare a priority of active electronic devices in the electronic devices 102 with a priority of the electronic device corresponding to the activation request. The controller 11 may allocate a priority to the electronic devices 102 included in the system 103 based on a predetermined criterion.

Furthermore, the controller 11 may determine schedule information to activate the electronic device corresponding to the activation request based on a result of comparing the priorities.

According to an example embodiment, the controller 11 may predict a time at which active electronic devices are inactivated based on a usage history of the active electronic devices and may determine schedule information including the predicted time information. In more detail, the controller 11 may determine schedule information to activate at least one electronic device corresponding to an activation request at the predicted time.

According to an example embodiment, the controller 11 may compare a priority of active electronic devices with a priority of at least one electronic device corresponding to the activation request and thus inactivate one electronic device from among the active electronic devices. For example, the controller 11 may generate a control signal for inactivating at least one of electronic devices having a lower priority than a display from among the active electronic devices to activate the display corresponding to the activation request.

Also, the controller 11 may generate a control signal for activating at least one electronic device corresponding to an activation request, and the communicator 12 may transmit the control signal generated by the controller 11 to at least one electronic device corresponding to an activation request.

Furthermore, the controller 11 may predict a time at which the electronic device corresponding to the activation request is inactivated based on a usage history of the electronic device corresponding to the activation request. For example, the controller 11 may predict that the display will be inactivated after a predetermined time (or at a specific time) based on usage time information for each electronic device of the display.

In addition, the controller 11 may use the predicted time to determine schedule information to reactivate the inactivated electronic device according to a result of comparing the priorities.

According to an example embodiment, the controller 11 may control a state of the electronic devices 102 of the system 103 based on the schedule information. For example, the controller 11 may generate a control signal that controls the state of the electronic devices 102 based on the schedule information. Furthermore, the communicator 12 may transmit the control signal generated by the controller 11 to the electronic devices 102, the smart outlet, or the power supply.

According to an example embodiment, the controller 11 may update the schedule information. In more detail, the controller 11 may monitor the amount of change in power consumption of the system 103. For example, the controller 11 may determine a difference in power consumption of the system 103 before and after activation of at least one electronic device as the amount of change in power consumption of the system 103. Furthermore, the controller 11 may compare the amount of change in the power consumption of the system 103 with predetermined predicted power consumption. Furthermore, the controller 11 may determine whether a result of the comparing is within a predetermined range. For example, the controller 11 may determine a range of +10% to −10% of power consumption of the system 103 according to the schedule information as a predetermined range, but is not limited thereto. Furthermore, the controller 11 may update the schedule information if a result of the comparing is out of the predetermined range.

According to an example embodiment, the controller 11 may compare current power consumption and average power consumption of each electronic device to determine whether there is a defect in at least one electronic device. For example, the controller 11 may determine that the electronic device is defective when the current power consumption of the at least one electronic device exceeds twice the average power consumption. In addition, if it is determined that the electronic device is defective, the controller may generate visual or auditory notification information to indicate that the electronic device is defective. Furthermore, the user interface unit 13 may provide a user with the notification information generated by the controller 11.

According to an example embodiment, when the system 103 includes a plurality of power management devices, the controller 11 may control sub-power management devices. For example, the controller 11 may determine schedule information using power consumption-related information of electronic devices received from the sub-power management devices, and may generate a control signal according to the schedule information.

In addition, the controller 11 may determine schedule information based on power consumption-related information of electronic devices controlled by at least one power management device received from at least one power management device included in the system 103 through the communicator 12.

Furthermore, the controller 11 may control the user interface unit 13 to provide a user interface.

The communicator 12 may include one or more components for communicating with at least one of the electronic devices 102 included in the system 103, a power supply, a smart outlet, another power management device (e.g., a sub-power management device, etc.), and an external server.

According to an example embodiment, the communicator 12 may receive an activation request to activate at least one electronic device included in the system 103. For example, the communicator 12 may receive an activation request from the electronic devices 102 included in the system 103. In addition, the communicator 12 may provide the received activation request to the controller 11.

Furthermore, the communicator 12 may transmit a control signal to activate or inactivate a state of the electronic devices 102 under the control of the controller 11 to the electronic devices 102, the smart outlet, or the power supply.

In addition, the communicator 12 may receive information such as the amount of monitored power consumption and power usage time from the electronic devices 102 included in the system 103, the smart outlet, or the power supply.

According to an example embodiment, the communicator 12 may transmit notification information related to whether the electronic device is defective determined by the controller 11 to a maintenance service providing server of an electronic device.

According to an example embodiment, when the system 103 includes a plurality of power management devices, the communicator 12 may receive power consumption-related information of electronic devices controlled by at least one power management device from the at least one power management device. Furthermore, the communicator 12 may broadcast a signal (e.g., a beacon signal) that detects whether another power management device exists or may receive a signal broadcast by another power management device.

Furthermore, the communicator 12 may transmit a control signal according to the schedule information to a sub-power management device. In addition, the communicator 12 may transmit a control signal for controlling the sub-power management device to the sub-power management device.

Furthermore, when a user interface is provided through another electronic device (e.g., a mobile device of a user of the system 103), the communicator 12 may transmit or receive information necessary for providing the user interface.

The user interface unit 13 may provide information processed by the controller 11 to a user. According to an example embodiment, the user interface unit 13 may provide schedule information determined by the controller 11. In addition, the user interface unit 13 may provide a user with activation request list and defect notification of an electronic device that are obtained for a predetermined period.

According to an example embodiment, the user interface unit 13 may include an input device. For example, the input device may include a keypad, a dome switch, a touch pad, a jog wheel, a jog switch or the like, but is not limited thereto. The user interface unit 13 may obtain an activation request for activating at least one electronic device through a user's input. Also, the user interface unit 13 may provide the obtained activation request to the controller 11.

In addition, the user interface unit 13 may include a GUI. For example, the user interface unit 13 may provide at least one of schedule information generated by the controller 11, state information of each electronic device, an activation request list, electronic device information, and electronic device power consumption with the GUI. Furthermore, the user interface unit 13 may provide information requested by a user in response to a user input to the GUI.

The output unit 14 may include at least one device for outputting visual, auditory and/or sensory data provided by the user interface unit 13. For example, the output unit 14 may include a display unit 15, a sound output unit 16, and a vibration motor (not shown).

According to an example embodiment, the display unit 15 may display schedule information provided by the user interface unit 13. In addition, if it is determined that the electronic device is defective by the controller 11, the display unit 15 may provide a visual notification to notify the defect in the electronic device provided by the user interface unit 13.

According to an example embodiment, if it is determined that the electronic device is defective by the controller 11, the sound output unit 16 may provide an auditory notification to notify the defect in the electronic device provided by the user interface unit 13.

The example embodiments of the present invention can be written as computer programs and can be implemented in general-use digital computers that execute the programs using a computer readable recording medium.

The computer readable recording medium may be a magnetic storage medium (e.g., a ROM, a floppy disk, a hard disk, etc.), an optical reading medium (e.g., a CD ROM, a DVD or the like), and a carrier wave (e.g., transmission over the Internet).

The example embodiments are examples, and thus, it will be understood by those of ordinary skill in the art that various changes in form and details may be made therein without departing from the spirit and scope of the present invention. Therefore, the example embodiments should be considered in descriptive sense only and not for purposes of limitation.

The invention claimed is:

1. A method of operating a power management device configured to control a state of a plurality of electronic devices included in a system, the method comprising:
   obtaining an activation request to activate at least one electronic device from among the plurality of electronic devices;
   predicting power consumption of the at least one electronic device;
   identifying schedule information to activate the at least one electronic device based in part on a comparison of a threshold to a sum of the predicted power consumption of the at least one electronic device and a current power consumption of the system;
   transmitting, to the at least one electronic device, a control signal for activating the at least one electronic device, based on the schedule information;
   identifying a first value, wherein the first value is a difference in the current power consumption of the system before the at least one electronic device is activated and after the at least one electronic device is activated;

identifying a second value, wherein the second value is a difference between the first value and the predicted power consumption of the at least one electronic device;

determining whether the second value is within a predetermined range; and updating the schedule information based on a result of the determination, wherein the schedule information includes information about predicted times of activation of the at least one electronic device corresponding to the activation request and predicted times of inactivation of active electronic devices among the plurality of electronic devices.

2. The method of claim 1, wherein, if a sum of the predicted power consumption and the current power consumption of the system is greater than a predetermined threshold power, identifying the schedule information comprises inactivating at least one of the active electronic devices included in the system and activating the at least one electronic device corresponding to the activation request based on at least one of a priority or a usage history of the plurality of electronic devices.

3. The method of claim 2, wherein identifying the schedule information further comprises:

comparing a priority of the active electronic devices with a priority of the at least one electronic device corresponding to the activation request and inactivating the at least one of the active electronic devices;

activating the at least one electronic device corresponding to the activation request;

predicting a time when the at least one electronic device corresponding to the activation request is inactivated based on a usage history of the at least one electronic device corresponding to the activation request; and identifying the schedule information to reactivate the inactivated at least one electronic device based on a result of comparing the priorities by using the predicted time.

4. The method of claim 1, further comprising:

when the system includes at least one other power management device, receiving power consumption-related information of electronic devices managed by the at least one other power management device from the at least one other power management device, and wherein identifying the schedule information comprises identifying the schedule information based on power consumption of the electronic devices managed by the at least one other power management device, the predicted power consumption, and the current power consumption of the system.

5. The method of claim 1, further comprising:

comparing a current power consumption of the at least one electronic device and an average power consumption of the at least one electronic device;

identifying occurrence of a defect in the at least one electronic device according to a result of the comparing; and providing notification information on the occurrence of the defect according to a result of identifying the occurrence of the defect.

6. The method of claim 1, further comprising:

when the system includes at least one non-intelligent electronic device, obtaining power consumption of the non-intelligent electronic devices, wherein identifying the schedule information comprises:

identifying the schedule information based on the power consumption of the non-intelligent electronic devices, the predicted power consumption, and the current power consumption of the system.

7. The method of claim 1, further comprising:

providing a user interface including the schedule information of the at least one electronic device corresponding to the activation request.

8. The method of claim 7, further comprising:

updating the schedule information in response to a user input through the user interface.

9. A power management device configured to control a state of a plurality of electronic devices included in a system, the power management device comprising:

at least one processor configured to:

obtain an activation request to activate at least one electronic device from among the plurality of electronic devices;

predict power consumption of the at least one electronic device;

identify schedule information to activate the at least one electronic device based in part on a comparison of a threshold to a sum of the predicted power consumption of the at least one electronic device and current power consumption of the system;

control to transmit, to the at least one electronic device, a control signal for activating the at least one electronic device, based on the schedule information;

identify a first value, wherein the first value is a difference in the current power consumption of the system before the at least one electronic device is activated and after the at least one electronic device is activated;

identify a second value, wherein the second value is a difference between the first value and the predicted power consumption of the at least one electronic device;

determine whether the second value is within a predetermined range; and update the schedule information based on a result of the determination, wherein the schedule information includes information about predicted times of activation of the at least one electronic device corresponding to the activation request and predicted times of inactivation of active electronic devices among the plurality of electronic devices.

10. The power management device of claim 9, wherein, if a sum of the predicted power consumption and the current power consumption of the system is greater than a predetermined threshold power, the at least one processor is further configured to inactivate at least one of the active electronic devices included in the system and activate the at least one electronic device corresponding to the activation request based on at least one of a priority or a usage history of the plurality of electronic devices.

11. The power management device of claim 10, wherein the at least one processor is further configured to:

compare a priority of the active electronic devices with a priority of the at least one electronic device corresponding to the activation request and inactivate the at least one of the active electronic devices;

activate the at least one electronic device corresponding to the activation request;

predict a time when the at least one electronic device corresponding to the activation request is inactivated based on a usage history of the at least one electronic device corresponding to the activation request; and identify the schedule information to reactivate the inactivated at least one electronic device based on a result of comparing the priorities by using the predicted time.

12. The power management device of claim 9, further comprising:

a user interface unit configured to provide the schedule information of the at least one electronic device corresponding to the activation request.

13. A non-transitory computer-readable recording medium having recorded thereon a program for operating a power management device configured to control a state of a plurality of electronic devices included in a system, the program including code that, when executed by at least one processor of the power management device, causes the power management device to:

obtain an activation request to activate at least one electronic device from among the plurality of electronic devices;

predict power consumption of the at least one electronic device;

identify schedule information to activate the at least one electronic device based in part on a comparison of a threshold to a sum of the predicted power consumption of the at least one electronic device and a current power consumption of the system;

transmit, to the at least one electronic device, a control signal for activating the at least one electronic device, based on the schedule information;

identify a first value, wherein the first value is a difference in the current power consumption of the system before the at least one electronic device is activated and after the at least one electronic device is activated;

identifying a second value, wherein the second value is a difference between the first value and the predicted power consumption of the at least one electronic device;

determine whether the second value is within a predetermined range; and update the schedule information based on a result of the determination, wherein the schedule information includes information about predicted times of activation of the at least one electronic device corresponding to the activation request and predicted times of inactivation of active electronic devices among the plurality of electronic devices.

14. The non-transitory computer-readable recording medium of claim 13, wherein the code that, when executed by the at least one processor of the power management device, causes the power management device to inactivate, if a sum of the predicted power consumption and the current power consumption of the system is greater than a predetermined threshold power, at least one of the active electronic devices included in the system and activate the at least one electronic device corresponding to the activation request based on at least one of a priority or a usage history of the plurality of electronic devices.

15. The non-transitory computer-readable recording medium of claim 14, wherein the code that, when executed by the processor of the power management device, causes the power management device to:

compare a priority of the active electronic devices with a priority of the at least one electronic device corresponding to the activation request and inactivate the at least one of the active electronic devices;

activate the at least one electronic device corresponding to the activation request;

predict a time when the at least one electronic device corresponding to the activation request is inactivated based on a usage history of the at least one electronic device corresponding to the activation request; and identify the schedule information to reactivate the inactivated at least one electronic device according to a result of comparing the priorities by using the predicted time.

16. The non-transitory computer-readable recording medium of claim 13, wherein:

the program further includes code that, when executed by the at least one processor of the power management device, causes the power management device to obtain, when the system includes at least one other power management device, power consumption-related information of electronic devices managed by the at least one other power management device from the at least one other power management device; and the code that, when executed by the at least one processor of the power management device, causes the power management device to identify the schedule information based on power consumption of the electronic devices managed by the at least one other power management device, the predicted power consumption, and the current power consumption of the system.

17. The power management device of claim 9, wherein:

the at least one processor is further configured to obtain, when the system includes at least one other power management device, power consumption-related information of electronic devices managed by the at least one other power management device from the at least one other power management device; and the at least one processor is further configured to identify the schedule information based on power consumption of the electronic devices managed by the at least one other power management device, the predicted power consumption, and the current power consumption of the system.

* * * * *

UNITED STATES PATENT AND TRADEMARK OFFICE
CERTIFICATE OF CORRECTION

PATENT NO. : 11,079,833 B2
APPLICATION NO. : 15/744545
DATED : August 3, 2021
INVENTOR(S) : Rohit Ail et al.

Page 1 of 1

It is certified that error appears in the above-identified patent and that said Letters Patent is hereby corrected as shown below:

On the Title Page

Column 1, item (30), Line 1, "1512244" should read --1512244.3--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*